Sept. 25, 1956 B. C. SKINNER 2,764,233
APPARATUS FOR CONCENTRATING CITRUS JUICES OR THE LIKE
Filed July 27, 1950 2 Sheets-Sheet 1
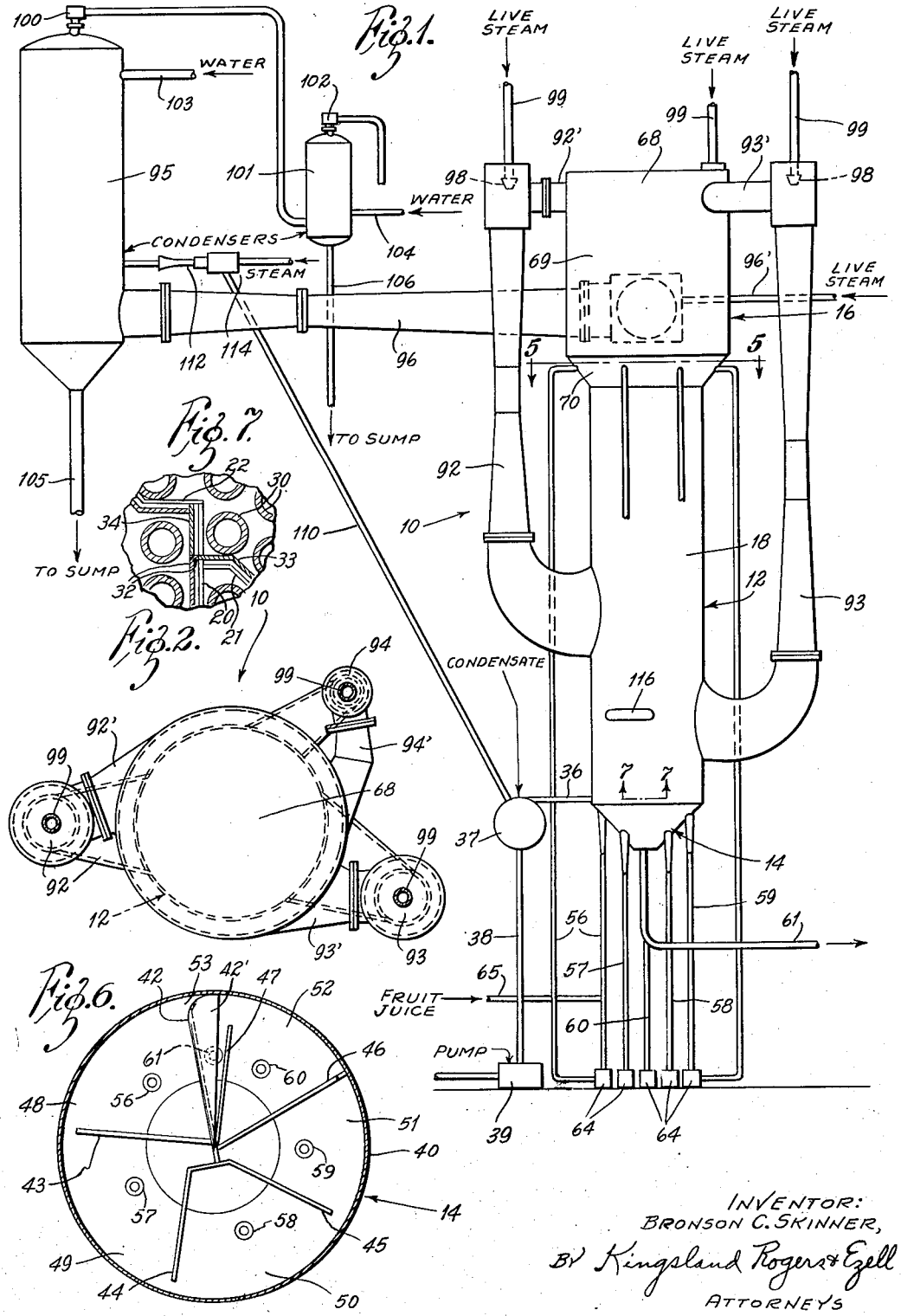
INVENTOR:
BRONSON C. SKINNER,
BY Kingsland Rogers & Ezell
ATTORNEYS

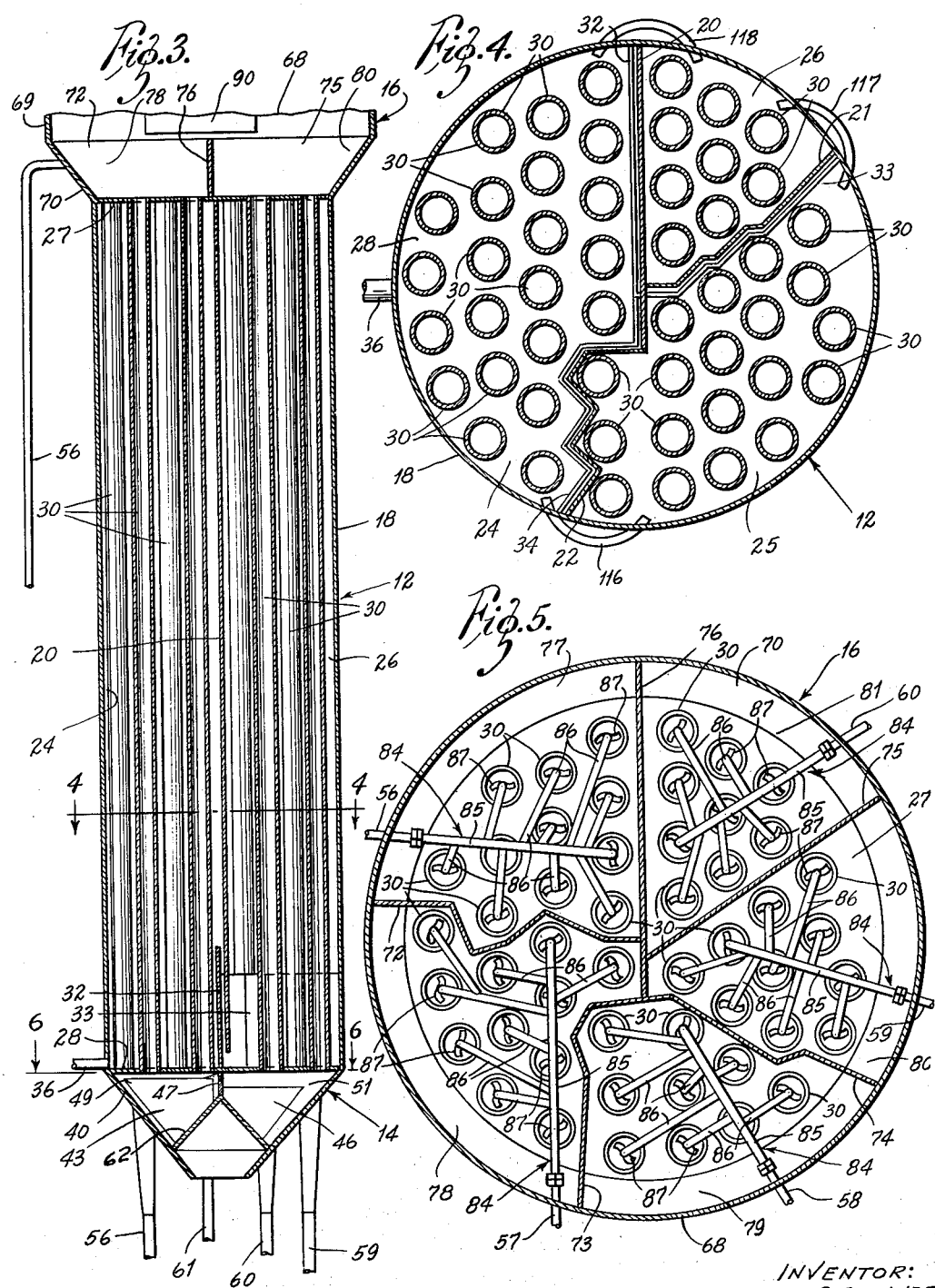

United States Patent Office 2,764,233
Patented Sept. 25, 1956

2,764,233

APPARATUS FOR CONCENTRATING CITRUS JUICES OR THE LIKE

Bronson C. Skinner, Dunedin, Fla., assignor, by mesne assignments, to Minute Maid Corporation, New York, N. Y., a corporation of Florida Application July 27, 1950, Serial No. 176,122

18 Claims. (Cl. 159—13)

The present invention relates generally to the evaporator art, and more particularly to a novel method of and apparatus for concentrating citrus juices and other suitable liquids by evaporation under vacuum.

Briefly, the present improved evaporator construction includes three evaporation compartments handling five evaporation stages for gradually concentrating citrus juices and other liquids. The evaporator is divided into a middle evaporation section having a plurality of tubes segregated into three separate compartments, a bottom section receiving juice from the discharge ends of the tubes of the middle section for progressive recirculation and discharge to storage, and a top section in which juice is sprayed into the upper ends of the evaporation tubes. Steam is supplied to the three evaporation compartments by jet boosters which entrain steam from the evaporating juice thereby effecting steam economy. Steam from the boiling juice is condensed or circulated as stated.

Therefore, an object of the present invention is to provide an evaporator construction for concentrating citrus juice and other liquids under vacuum by which a plurality of evaporation stages, for example, five, are handled in a lesser number of steam compartments, for example, three, all within a single consolidated unit.

Another object is to provide a novel method of concentrating citrus juices and other liquids under vacuum by means of which high fidelity concentrate is obtained.

Another object is to provide a novel method of concentrating citrus juices and other liquids in which a uniformly thin descending film of liquid is provided on the inner surface of a relatively large diameter tube by the action of rapidly ascending vapor evaporated from the descending liquid which smooths out the thin film, thereby preventing localized overheating and insuring balanced evaporation.

Another object is to provide a novel evaporator for concentrating citrus juices and other liquids which includes a plurality of evaporator tubes and novel means for spreading the liquid to be evaporated on the inner surfaces of the tubes in thin films.

Another object is to provide a novel multi-stage evaporator for concentrating citrus juices and other liquids which includes novel means for receiving and separating the liquid as it is concentrated and for passing the liquid from stage to stage and ultimately to storage.

Another object is to provide a novel evaporator construction incorporating a novel evaporator unit having interconnected steam compartments arranged to concentrate condensate in the steam compartment of lowest pressure for ultimate exhaust.

Other objects are to provide an evaporator construction for concentrating citrus juices and other liquids under vacuum which is economical in use of steam, which is of balanced construction in order to prevent overloading of some tubes and underloading of others, which is relatively inexpensive to build, which is highly efficient in its concentrating function, which is, in effect, three evaporators in one, thereby saving installation space and materially reducing routine maintenance, which is of rugged construction, and which is generally of improved construction in respect to equipment presently available.

The foregoing and other objects and advantages are apparent from the following description taken with the accompanying drawings, in which:

Fig. 1 is a diagrammatic elevational layout of an evaporator construction embodying the teachings of the present invention, including condensing structure for waste steam;

Fig. 2 is a diagrammatic plan view of the evaporator construction of Fig. 1;

Fig. 3 is a diagrammatic vertical cross-sectional view through the evaporator section thereof, booster jets being omitted;

Fig. 4 is an enlarged diagrammatic horizontal cross-sectional view on the line 4—4 of Fig. 3;

Figs. 5 and 6 are enlarged diagrammatic horizontal cross-sectional views on the lines 5—5 and 6—6 of Figs. 1 and 3, respectively; and Fig. 7 is an enlarged diagrammatic fragmentary horizontal view taken substantially on the line 7—7 of Fig. 1.

Referring to the drawings more particularly by reference numerals, 10 indicates generally an evaporator construction incorporating the concepts of the present invention, which broadly includes a middle evaporator section 12, a bottom section 14, and a top section 16, together with interrelating and associated units and parts.

The middle evaporator section 12 includes an outer casing 18 shown as a metal cylinder, and three vertical partition walls 20, 21, and 22 which divide the interior of the casing 18 into three steam chests or compartments 24, 25, and 26, a top horizontal wall 27, and a bottom horizontal wall 28, all of which are welded to the casing 18. The walls 20, 21 and 22 abut the top wall 27 and terminate about one-half inch short of the bottom wall 28. Vertical tubes 30 of relatively large diameter are welded to and open through both the bottom wall 28 and the top wall 27, twenty-two tubes 30 being shown in compartment 24, nineteen in compartment 25, and nine in compartment 26 by way of illustration. The tubes 30 are of sufficient diameter to permit the ready and rapid removal upwardly of evaporated vapors. A vertical dam or wall segment 32 substantially eighteen inches in height is mounted on the bottom wall 28 in spaced relation to the lower portion of the wall 20 and forms therewith a vertical passage communicating compartments 24 and 26. Similarly, a vertical dam 33 substantially thirteen and a half inches in height is mounted on the bottom wall 28 in spaced relation to the lower portion of the wall 21 communicating compartments 25 and 26, and a vertical dam 34 substantially four and a half inches in height is mounted on the bottom wall 28 in spaced relation to the lower portion of the wall 22 communicating the compartments 24 and 25.

Inasmuch as these dams 32—34 cooperate with the partitions 20—22 to provide water seals between the compartments 24—26, they must obviously be arranged to enforce a predetermined path of fluid flow. Fig. 7 illustrates an appropriate arrangement as viewed upwardly from beneath the partitions 20—22.

A discharge pipe 36 is provided through the casing 18 into the compartment 24 which drains steam condensate from the evaporator section 12 into a condensate tank 37, a suitable pipe 38 and pump 39 being provided for moving such condensate from the tank 37 to a drain. Preferably, the tank 37 has an internal float (not shown)

for automatically energizing the pump 39 when condensate reaches a predetermined level in the tank 37.

The bottom section 14 includes a casing or sump 40 formed as an inverted cone into which all tubes 30 discharge. Vertical dams 42, 43, 44, 45, 46 and 47 of decreasing heights are disposed in the casing 40, dividing the same into six compartments 48, 49, 50, 51, 52, and 53, leading from which, through the casing 40, are pipes 56, 57, 58, 59, 60 and 61, respectively. The dams 42—47 in one installation are sheet metal partitions welded to the interior of the sump 40 and to an interior core 62. Excess juice in compartment 48 will flow into compartment 49, excess juice in compartment 49 into compartment 50, and so on, the overflow rate depending in the main on the raw juice supplied to the evaporator 10 and the rate of evaporation. The concentrated juice in compartment 53 flows to storage. Eleven of the tubes 30 in compartment 24 discharge into compartment 48 and eleven into compartment 49; nine tubes 30 in compartment 25 discharge into compartment 50 and ten into compartment 51; and the nine tubes 30 in compartment 26 discharge into compartment 52. Any suitable juice diverters or sheds, such for example as the sloped portion 42' of the partition 42, may be used to direct juice from the tubes 30 into the required compartment in the bottom section 14. The pipes 56—60 return, as indicated in Fig. 1, to the top section 16 for recirculation of the juice, the pipe 61 leading from compartment 53 to storage. Suitable pumps 64 raise the juice through pipes 56—60. Fresh juice may be introduced into the suction side of pipe 56 by pipe 65.

The top section 16 comprises a casing 68 including an upper cylindrical portion 69 and a lower frusto-conical portion 70 which rests on the casing 18. As is shown in Fig. 5, vertical dams 72, 73, 74, 75 and 76 are provided in the lower portion 70 which divide it into compartments 77, 78, 79, 80 and 81 which correspond to the compartments 48—52, respectively, in the bottom section 14, the same tubes 30 discharging into said latter group of compartments also opening into the respective corresponding compartments of the former group.

A juice dispersal unit 84 is connected to the top of each pipe 56—60, extending through the lower portion 70 of the casing 68, and includes a main pipe segment 85 and tributary pipe segments 86, a juice discharge "spider" 87 being connected to the outer end of each pipe segment 86 and disposed in or at the head or top of a tube 30 which discharges juice substantially tangentially into the tube 30 to insure spreading of the juice over the full internal surface thereof. The "spider" 87 may include two or more tube arms curved as indicated in Fig. 5 to approach the curve of the associated tube 30. Juice leaves the discharge ends of the "spiders" 87 under a pressure predetermined as adequate to effect the desired spread thereof. The arms of the "spider" 87 may be rotatable under action of the discharging juice if desired.

Within the upper portion 69 is a centrifugal separator 90 which may be of standard design and which receives steam and entrained juice discharging vertically from the tubes 30. The entrained juice is separated from the steam and returned to the tubes 30 and the steam is drawn into steam booster tubes 92, 93, and 94 where it is compressed and used along with supplied steam, or is discharged into a suitable simple baffled barometric condenser 95 connected into the upper portion 69 by a steam tube 96 (Fig. 1). A nozzle 96' supplies live steam to the tube 96. This tube 96 maintains the desired high vacuum in the tubes 30 and on the juice. The tubes 92, 93, and 94 are connected into the upper portion 69 by steam conduits 92', 93', and 94', and discharge into compartments 24, 25, and 26, respectively, through the casing 18. Live steam is supplied to the tubes 92—94 by nozzles 98 which are connected to a source of supply by pipes 99. The tubes 92—94 may be of standard construction and each is designed to use a predetermined amount of steam per hour at a specified pressure and to remove a predetermined amount of steam from the upper portion 69.

A pipe 110 connects the condensate tank 37 with a jet 112 fed by a steam nozzle 114 and discharging into the condenser 95. By the pipe 110 and the jet 112, air and excess or uncondensed steam are removed from the compartment 24, thereby contributing to maintenance of steam in the compartment 24 at a substantially predetermined pressure. Run-around pipes 116, 117, and 118 connect the compartments 24—25, 25—26, and 26—24, respectively, as is indicated in Fig. 4. The intercommunication between compartments afforded by the pipes 116—118, being above the dams 32—34 (Fig. 1) and hence above the condensate level, assures a continuous, albeit limited, flow of vapor from the high pressure compartments 25 and 26 to the low pressure compartment 24. Obviously, if the compartments contain non-condensing gases, such as air, some of the latter will be mixed with the vapor which finds its way to the compartment 24. Thus, these pipes 116—118 serve to remove air to the compartment 24 for withdrawal, and, with the dams 32—34, contribute to maintaining proper pressures in the compartments 25 and 26. The number and size of the several pipes 116—118 must clearly be such, in relation to the volume of the steam compartments which they interconnect, that they conduct only a small percentage of the total volume of steam. Hence, their actual number and size depend upon factors of each installation.

A jet 100 leads from the condenser 95 to a second condenser 101 from which a jet 102 leads to atmosphere. Ground temperature water is supplied to the condensers 95 and 101 by suitable pipes 103 and 104, respectively, the condensate and water passing by discharge pipes 105 and 106, respectively, to sumps more than thirty-two feet below the condensers.

It is understood, of course, that the evaporator 10 is suitably supported for operation. While size and dimensions are not of the essence of the invention, in one installation the over-all height of the evaporator 10 is nearly forty-five feet from the pumps 64 to the top of the upper section 16, the casing 18 is substantially six and a half feet in diameter by over twenty feet in height, and the other parts, elements and units are of comparable size.

*Operation*

When the evaporator 10 is in operation, steam is supplied to the three compartments 24, 25, and 26 of the evaporator section 12 by the steam booster tubes 92, 93, and 94, respectively, in the required quantities, part of which is live steam from the nozzles 98 and the other part steam from the juice drawn into the said jets through the steam conduits 92', 93', and 94'. The steam in the evaporator section 12 is below atmospheric pressure, as is well known in the citrus industry, in order to obtain low effective temperatures within said compartments, since citrus juices should not be subjected to high temperatures. By way of example, the steam in compartment 24 may be at 90° F., that in compartment 25 may be 97° F., and that in compartment 26 may be 107° F., the pressure in each instance being that required to provide said compartments with steam at such temperatures, being readily determinable from standard tables. There is, of course, a heat differential between the inner and outer surfaces of the tubes 30, which may be readily determined and which, in one installation, was 16° F. In this example installation, therefore, with steam at the above suggested temperatures, the inner surfaces of the tubes 30 in compartments 24, 25, and 26 would be 74° F., 81° F., and 91° F., respectively. Manifestly, as is also well known, the citrus juice is under a vacuum adequate to effect boiling action at the temperatures of the inner surfaces of the tubes 30.

Taking a specific example, assume that orange juice is being continuously pumped into the evaporator 10 at a Brix of 12. This juice is initially recirculated through one group of tubes 30 in the compartment 24 by the pipe 56 under the action of its pump 64. As more juice is pumped into the evaporator, juice overflows the dam 43 into the compartment 49 in the lower section 14 and is recirculated through the second group of tubes 30 in the compartment 24 by the pipe 57 under the action of its pump 64. The combined evaporation effect in the tubes 30 in the compartment 24 may raise the juice to a Brix of 19.

As the juice is continuously pumped into the evaporator 10, juice in compartment 49 will overflow into compartment 50 and be recirculated through the first group of tubes 30 in compartment 25 through the medium of the pipe 58 and its pump 64 which may raise the Brix to 24. Similarly, juice will overflow from compartment 50 into compartment 51 and be recirculated through the second group of tubes 30 in compartment 25 through the pipe 59 and its pump 64 which may raise the Brix to 29.

Juice will flow over the dam 46 into the compartment 52 from the compartment 51 as the evaporation process continues and be recirculated through the tubes 30 in the compartment 26 through the pipe 60 and its pump 64 which may raise the Brix to 35. Juice at the predetermined desired Brix will overflow the dam 47 into the sixth compartment 53 and be carried away to storage or filling machines by the pipe 61.

The steam in the compartments 24, 25, and 26 is maintained at predetermined low temperatures, such as the illustrative temperatures above, and corresponding pressures to boil the juices at the required low temperatures, the effective temperatures in succeeding compartments necessarily increasing as the concentration of the juice increases, since all juice is under the same vacuum. Substantial steam economy is effected through utilization of at least a portion of the steam from the juice which is drawn into the booster tubes 92, 93, and 94 through the conduits 92', 93', and 94', respectively.

As is detailed above, the juice is discharged into the relatively large tubes 30 in a manner to spread it into downwardly flowing thin cylindrical films which is done to effect efficient heating and subsequent desired evaporation. An important feature is the action on these cylindrical films of the rapidly ascending evaporated vapors which materially assist in maintaining the thin cylindrical films at substantially even depth thereby obviating localized overheating zones. Both the pulling action of the vacuum drawing jet 96 and the normal rising action of the evaporated vapors insure rapid vertical movement of such vapors.

Condensate within the compartments 24, 25, and 26 flows counter to the juice upon the bottom wall 28, that within the compartment 26 being forced over the dam 33 into the compartment 25 and the condensate in the compartment 25 being forced over the dam 34 into the compartment 24 from which all condensate is evacuated through the drain pipe 36. The high dam 32 prevents condensate in compartment 26 from passing directly to compartment 24 and a water seal is maintained therein, as in compartments 25 and 24, so that normally there is no interchange of steam, which, as is stated above, is at different temperatures and pressures. When operating conditions are such that there is insufficient depth of condensate in the compartment 24 to fill the drain pipe 36, due either to a light load and consequent low heat absorption or to too much steam being admitted to the compartment, the excess steam is withdrawn through the pipe 36, the tank 37, and the pipe 110 by the jet device 112.

Clearly, the present evaporator is, in effect, a combination of three evaporators, thereby conserving floor space and achieving economy in construction, installation, operation, and maintenance.

The present evaporator attains a balanced evaporation rate throughout, eliminating overloading of some tubes 30 and underloading of others. There is the tube group progression handling of the juice with suitable steam temperatures and pressures for each group of tubes, and there is the even introduction of the juice into the top of each tube 30 through the dispersion units 84 resulting in thin films of juice flowing down each, thereby obtaining maximum evaporation.

It is manifest that there have been provided apparatus for and a method of concentrating citrus juices and the like which fulfill the objects and advantages sought therefor.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. Evaporator construction comprising, in combination, a middle evaporator section including a casing of cylindrical form disposed in upright position, vertical partitions in said casing extending from the top to just short of the bottom thereof and dividing the same into a plurality of interconnected steam compartments, a plurality of spaced vertical tubes in each steam compartment supported by the ends of said casing and opening therethrough, a bottom section including a casing secured to said middle section casing and forming a sump for receiving liquid from said tubes, partitions in said bottom section casing dividing the same into a plurality of liquid receiving compartments including a discharge compartment, said partitions being of predetermined gradually decreasing heights and arranged so that excess liquid will overflow from compartment to compartment in a predetermined path, a top section including a casing secured to said middle section casing and forming a compartment for receiving steam from said tubes, a separator mounted within said top section casing disposed for removing entrained liquid from steam received within said top section casing from said tubes, means mounted in said top section casing for receiving a liquid and for discharging the same into the upper ends of said tubes against the inner walls thereof, means communicating with said top section casing for removing vapor therefrom and for pulling and maintaining a predetermined vacuum in said top section casing, in said tubes, and in said lower section casing, said latter means including separate means for supplying steam under predetermined pressure to each compartment within said middle evaporator section casing including a live steam jet injector for each of said compartments, each live steam jet injector being connected into said top section casing and disposed to withdraw a predetermined amount of vapor received therein from said tubes to supplement the live steam supply, means for removing condensate from said middle casing compartments, means for maintaining different predetermined pressures in said middle casing compartments including means for exhausting excess steam, separate means for moving liquid from each liquid receiving compartment of said bottom section upwardly into said liquid receiving and discharging means in said top section casing for effecting recirculation thereof down different predetermined groups of tubes and back to said compartment, and means for feeding fresh liquid into one of said liquid moving means.

2. In an evaporator construction including a steam chamber and a plurality of liquid receiving tubes divided into groups extending therethrough and discharging therebeneath, in combination, liquid handling apparatus disposed beneath said steam chamber and disposed to receive liquid from said tubes including a casing, partitions in said casing dividing the same into compartments for receiving the liquid discharge from different groups of tubes, said partitions being of gradually decreasing height and disposed in a predetermined pattern to define an overflow path for excess liquid, and means besides the partitions defining said overflow path for discharging liquid from each compartment for recirculation through an associated group of liquid receiving tubes.

3. In an evaporator construction, in combination, an evaporator section including a casing forming a steam chamber, partitions dividing said steam chamber into steam compartments, vertical tubes extending through said steam compartments, said tubes opening above and below said steam compartments, separate means for introducing steam into each steam compartment at predetermined different pressures, liquid handling apparatus disposed beneath said evaporator section casing to receive liquid from said tubes including a sump casing supported subjacent said evaporator section casing, partitions dividing said sump casing into liquid receiving compartments including a discharge compartment, each liquid receiving sump casing compartment except said discharge compartment being disposed to receive liquid from a group of tubes disposed within a single steam compartment, said sump casing partitions being of progressively decreasing heights and disposed in a predetermined pattern to define an overflow path for liquid, separate means for transferring liquid from within each liquid receiving sump compartment except said discharge compartment to a level above said tubes, means for discharging transferred liquid into the upper ends of tubes emptying into the sump casing compartment from which the liquid is drawn for recirculation of the liquid, and means for drawing off from said discharge compartment in said sump casing liquid which has overflowed partitions in said sump casing and into said discharge compartment.

4. Evaporator construction like that of claim 3, and including means for maintaining the tube interiors and the sump casing compartments under a predetermined vacuum so that liquid in said tubes will boil at predetermined low temperatures.

5. Evaporator construction like that of claim 3, and including means communicating said steam compartments, said means including dams of predetermined heights arranged to channel condensate from a steam compartment of higher pressure to a steam compartment of lower pressure, and means for exhausting condensate and excess steam from the steam compartment of lowest pressure.

6. A multi-stage evaporator construction comprising, in combination, an evaporator section, a liquid receiving section below and secured to said evaporator section, a liquid charging section above and secured to said evaporator section, said evaporator section including a closed casing defining a steam chamber, upright partitions in said casing defining steam compartments, a plurality of upright tubes in each steam compartment opening into said charging section and discharging into said liquid receiving section, separate means for introducing steam into each steam compartment under different predetermined pressures, said liquid receiving section including a casing, a plurality of dams in said liquid receiving casing defining separate liquid receiving sumps including a discharge sump, each liquid receiving sump except said discharge sump being disposed to receive liquid from tubes within but a single steam compartment, there being at least one sump beneath each steam compartment, said charging section including a casing, separate liquid receiving and charging means in said charging section casing for each group of tubes discharging into each sump, a liquid conduit connecting each sump and its associated liquid receiving and charging means, pump means interconnected in each liquid conduit for moving liquid from the sump to the liquid receiving and charging means associated therewith, each interrelated group of tubes, sump, liquid conduit with pump, and liquid receiving and charging means comprising an evaporation stage, there being an initial evaporation stage and progressively concentrated evaporation stages, and means for introducing liquid exclusively into the initial evaporation stage, said dams in said casing of said liquid receiving section being of decreasing heights between different pairs of adjacent sumps, the highest two dams defining the sump forming part of the initial evaporation stage, so that liquid above a predetermined volume in each sump will flow to the sump of the next more concentrated evaporation stage, and means for discharging from the evaporator construction concentrated liquid overflowing the sump of the most concentrated stage.

7. A multi-stage evaporator construction like claim 6 and including means for maintaining the interior of the tubes and connecting areas under a vacuum in order to lower the boiling point of the liquid.

8. A multi-stage evaporator construction like claim 6 and including means for capturing and utilizing at least a part of the steam vapors evaporated from the liquid in the heating of liquid in the tubes.

9. A multi-stage evaporator construction like claim 6, and including means for exhausting condensate and excess steam from the steam compartment of lowest steam pressure, interconnecting means between said steam compartment of lowest steam pressure and the steam compartment of next lowest pressure permitting discharge from the latter into the former of excess condensate but preventing undue loss of steam from the latter to the former under normal predetermined operating pressures, and similar interconnecting means progressively between all steam compartments, so that condensate is exhausted progressively from the steam compartment of highest pressure to the steam compartment of lowest pressure for ultimate exhaust from the latter.

10. In an evaporator construction, in combination, an evaporator unit including a plurality of tubes mounted in a closed casing having a bottom upright partitions in said casing dividing the interior thereof into steam compartments, said partitions being supported in positions with the lower edges spaced a predetermined small distance from the casing bottom, a dam disposed adjacent to and spaced from the lower portion of each partition and mounted on the casing bottom, said dams being of different heights and being arranged in a manner permitting overflow of liquid from one steam compartment to an adjacent steam compartment as a result of a higher pressure in said one steam compartment than in said adjacent steam compartment, said partitions and associated dams being arranged in said casing in a manner defining a flow path for liquid from the steam compartment in which the highest pressure is maintained ultimately to the steam compartment in which the lowest pressure is maintained, and means for exhausting liquid from said steam compartment in which the liquid ultimately accumulates.

11. Evaporator construction like claim 10 and including separate means for introducing steam into each steam compartment at required pressure, the tubes mounted in the casing being disposed in groups, one group in each steam compartment, each tube opening above and below said casing and adapted to receive and conduct heat supplied to said steam compartments.

12. In an evaporator construction, in combination, a vertical steam-tight casing, a plurality of tubes extending vertically through said casing and opening exteriorly above and below the same, vertical partitions disposed within said casing and dividing it into a plurality of heating compartments, said partitions being also effective to divide said plurality of tubes into a plurality of groups of tubes, means for heating said heating compartments and the tubes therewithin, a sump disposed below said casing, means dividing said sump into a plurality of sump compartments, said dividing means being such as to provide for a flow of liquid progressively through said sump compartments, each sump compartment being disposed so as to receive a gravity flow of liquid from not more than one of said groups of tubes, there being a greater number of sump compartments than groups of tubes so that at least one of said groups of tubes may discharge into more than one of said sump compartments, means for returning at least some of the liquid received in individual sumps to the upper ends of those said tubes which are adapted to discharge into the particular sump from which the liquid is returned, means for adding fresh liquid to one of said groups of tubes, and means for withdrawing treated liquid from one of said sump compartments.

13. The combination of claim 12 wherein there is at least one sump compartment into which no tubes are adapted to be discharged.

14. The combination of claim 12 wherein there is a different number of tubes in each group thereof.

15. The combination of claim 12 wherein at least two sump compartments are adapted to receive liquid discharged from respectively different numbers of tubes in the same group thereof.

16. The combination of claim 12 wherein means are provided to maintain different temperatures in each of said heat compartments.

17. The combination of claim 16 wherein the means for maintaining different temperatures include liquid passage means communicating adjacent compartments.

18. In an evaporator construction including a steam chamber and a plurality of liquid receiving tubes extending therethrough and opening exteriorly thereabove, in combination, apparatus for receiving a liquid and for feeding the same into said tubes as a thin film on the inner surface of each including a predetermined number of liquid receiving main pipes disposed above said tubes, a plurality of tributary pipes extending from each main pipe, each tributary pipe terminating adjacent the open upper end of a tube, and a rotatable "spider" having discharge outlets disposed adjacent the inner surface of its respective associated tube for discharging liquid horizontally and substantially tangentially against such inner surface to spread the liquid over such inner surface in a relatively thin film.

References Cited in the file of this patent

UNITED STATES PATENTS

| | | |
|---|---|---|
| 341,669 | Lillie | May 11, 1886 |
| 521,946 | Cooper | June 26, 1894 |
| 1,028,738 | Kestner | June 4, 1912 |
| 1,371,784 | Griere | Mar. 15, 1921 |
| 1,524,184 | Lawrence | Jan. 27, 1925 |
| 1,878,651 | Teetsow | Sept. 20, 1932 |
| 2,073,738 | Faber | Mar. 16, 1937 |
| 2,092,470 | Peebles | Sept. 7, 1937 |
| 2,182,428 | Fladmark | Dec. 5, 1939 |
| 2,334,959 | Rosenblad | Nov. 23, 1943 |
| 2,343,085 | Savell | Feb. 29, 1944 |
| 2,570,211 | Cross | Oct. 9, 1951 |
| 2,570,212 | Cross | Oct. 9, 1951 |

FOREIGN PATENTS

| | | |
|---|---|---|
| 17,785 | Germany | Apr. 26, 1882 |
| 76,384 | Germany | July 27, 1894 |
| 450,809 | Germany | Aug. 5, 1925 |
| 240,335 | Great Britain | Oct. 1, 1925 |
| 246,807 | Great Britain | Dec. 10, 1925 |
| 24,429 | Netherlands | June 15, 1931 |
| 394,587 | Great Britain | June 29, 1933 |
| 458,963 | Great Britain | Dec. 30, 1936 |